Sept. 19, 1944.  E. A. NORDBERG  2,358,654
MANUFACTURE OF CAPACITORS
Filed Feb. 11, 1943  2 Sheets-Sheet 2
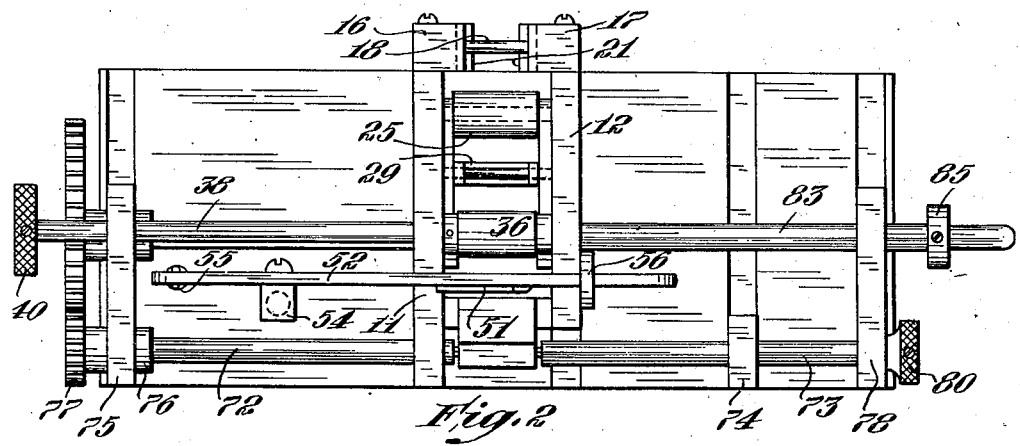
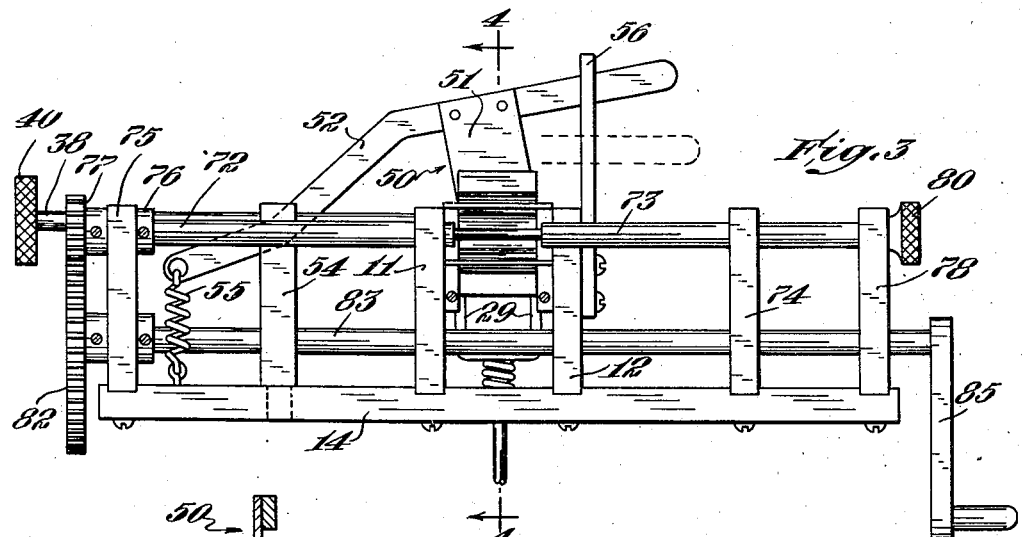
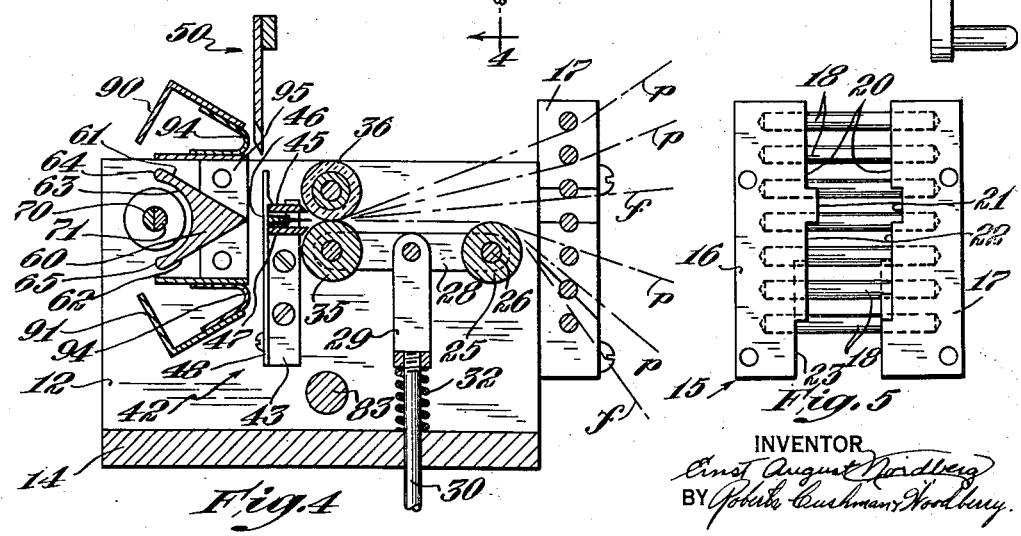
INVENTOR
Ernst August Nordberg
BY Roberts Cushman Woodbury
ATTORNEY Patented Sept. 19, 1944

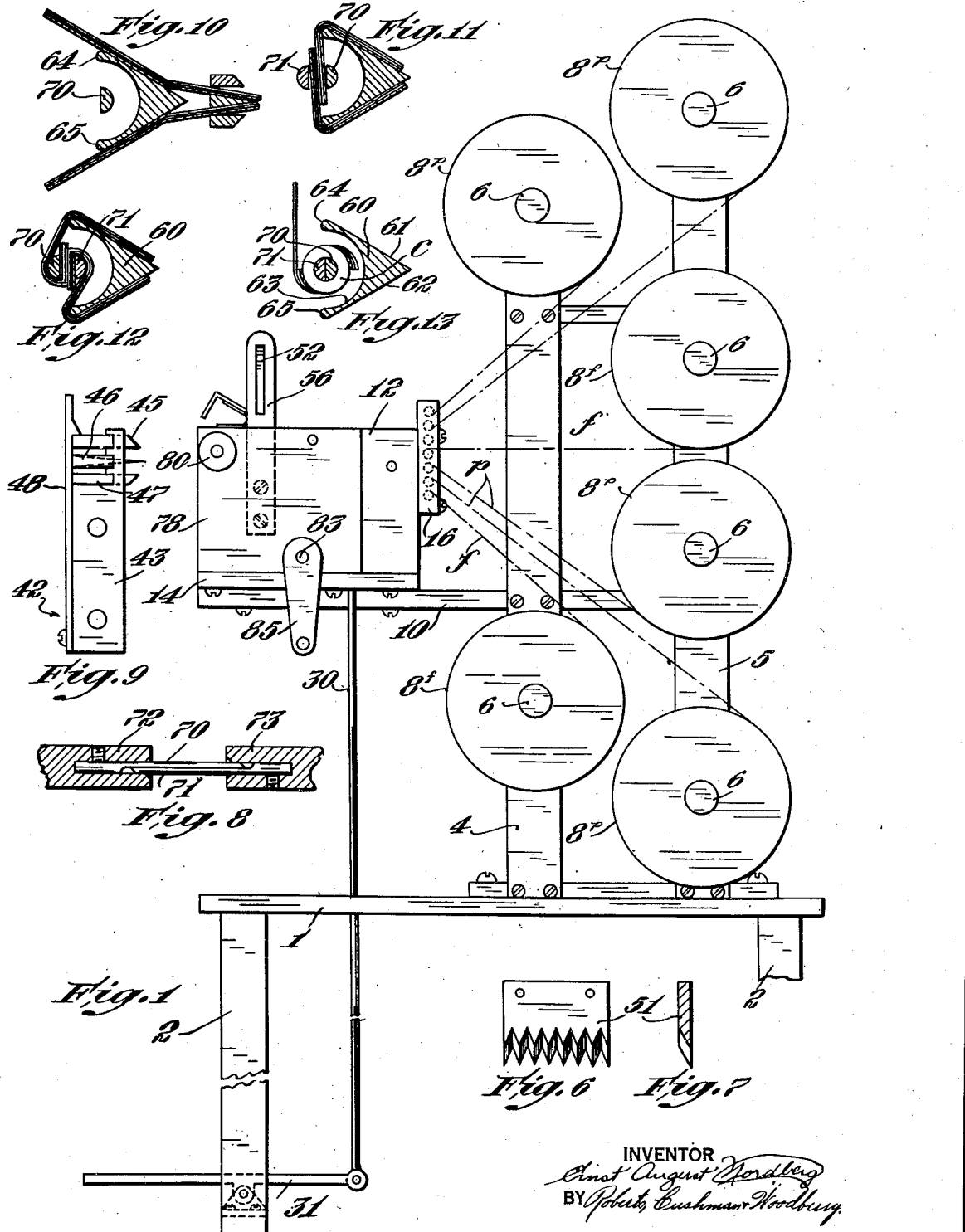

2,358,654

UNITED STATES PATENT OFFICE 2,358,654

MANUFACTURE OF CAPACITORS

Ernst August Nordberg, Norwood, Mass., assignor to Tobe Deutschmann, Canton, Mass.

Application February 11, 1943, Serial No. 475,578

12 Claims. (Cl. 242—56)

This invention relates to an apparatus for winding capacitors, and its principal objects are to provide an efficient and reliable apparatus capable of winding capacitors of varying sizes, and to provide an apparatus which is of strong and durable construction, easy to operate, and which may be readily adjusted to wind capacitors having either aligned or offset coils, as for example, capacitors of the non-inductive type.

Further objects will be apparent from a consideration of the following description and accompanying drawings, wherein Fig. 1 is a side elevation of a winding apparatus embodying the present invention;

Fig. 2 is a top plan view of the winding head;

Fig. 3 is a front elevation of the winding head;

Fig. 4 is an enlarged section substantially on the line 4—4 of Fig. 3;

Fig. 5 is an elevational view of the guiding means for the foils and paper insulation of a non-inductive capacitor;

Figs. 6 and 7 are enlarged front and sectional views of the severing knife;

Fig. 8 is an enlarged section through the preferred form of winding mandrel;

Fig. 9 is an enlarged side elevation showing the separator members and associated parts; and Figs. 10 to 13 are enlarged vertical sections, somewhat exaggerated, illustrating the various steps in winding a capacitor in accordance with the present invention.

According to the present invention a capacitor is formed from a plurality of elongate strips of metal foil and insulating sheet material, such as paper or the like, which are first drawn from a supply roll or other suitable source and guided in any appropriate manner to form two plies, each consisting of a layer of metal foil and at least one layer of paper or other suitable insulating material separating the metal foils. The free or leading ends of the plies are then guided and/or applied in opposite directions to a suitable winding mandrel comprising a removable section by means of which the free ends of the plies may be clamped or otherwise secured in place so that the metal foils are separated from each other by the layers of insulating material. When thus positioned, the mandrel is rotated manually, or by a suitable motor, to build up the required number of convolutions of alternate layers of metal foil separated by the layers of insulating sheet material, after which the plies may be severed, the cut ends appropriately fastened or sealed, and the capacitor thus formed may be quickly and easily removed from the winding mandrel by withdrawing its removable section. In making a non-inductive capacitor the procedure is substantially the same except that the metal foils are laterally offset relative to each other and to the insulating sheet material, and to this end appropriate guiding means, such as hereinafter described, may be employed.

Referring to the drawings, the winding machine shown therein comprises a suitable support such as a bench or table having a top 1 supported by legs 2 at a convenient height for the operator, as shown in Fig. 1, and a pair of spaced uprights or posts 4 and 5 rigidly secured to the top 1. The uprights 4 and 5 carry laterally projecting spindles 6, arranged in staggered relation, for supporting a plurality of supply rolls of metal foil $f$ and paper or the like insulating sheets $p$. As this particular machine is designed for winding non-inductive capacitors, comprising a pair of offset metal foils $f$ separated by four layers of paper insulation $p$, there are two supply rolls 8$f$ of metal foil and four supply rolls 8$p$ of paper, although it is to be understood that the number of supply rolls of foil and insulation may be varied in accordance with the particular type of capacitor to be wound.

A horizontal bracket or shelf 10 is rigidly secured to the uprights 4 and 5 and projects laterally therefrom to provide a rigid support upon which the guiding and winding mechanisms and associated parts are mounted, as are shown in Fig. 1. Spaced upstanding walls 11 and 12 are rigidly secured to a base member 14 which is attached to the bracket 10, the walls 11 and 12 constituting, in effect, a housing for the guiding and winding mechanisms. Secured to the inner ends of walls 11 and 12 is a rear guiding mechanism 15 (Fig. 5) for the foils $f$ and insulation $p$, which mechanism comprises a pair of vertically extending elongate blocks 16 and 17 formed with a plurality of horizontally aligned openings to receive the end portions of guide rods 18. The inner face of block 16 is formed with stepped lateral projections which cooperate with corresponding depressions in the adjacent face of block 17 to provide relatively offset guiding surfaces 20, 21, 22 and 23 engageable with the foils and insulating sheets. The guides 20—23 are so arranged with respect to the guide rods 18 and supply rolls 8$f$ and 8$p$, that when the foils $f$ and insulation $p$ are drawn off, as illustrated by the dot and dash lines of Figs. 1 and 4, the guiding surfaces 20 and 22 maintain the insulating sheets $p$ in proper registry, while the surfaces 21 and 23 guide the foils *f* into an offset position relative to each other and to the insulating sheets *p*.

A guide roll 25 (Fig. 4) is rotatably mounted on a pivot 26 carried by one end of a pair of rocker arms 28 which is pivotally connected to a yoke 29. The yoke 29 is connected to a vertically disposed operating rod 30 which extends downwardly through openings in the bottom wall 14 and bench top 1 and is pivotally connected to a treadle 31 which in turn is pivotally connected to one of the legs 2, as shown in Fig. 1. A spring 32 is circumposed about the upper end of rod 30 and normally holds the rocker arm 28 and associated parts in a substantially horizontal position, as illustrated in Fig. 4, which position may be varied by depressing or elevating the free end of the treadle 31 as hereinafter more fully explained. The opposite ends of the rocker arms 28 rotatably support an adjustable or floating feed roll 35 arranged to cooperate with fixed feed roll 36 journaled in openings in walls 11 and 12. The pressure exerted by the spring 32 is such that normally the floating feed roll 35 contacts the fixed feed roll with a slight pressure which may be varied by manipulating the treadle 31. The feed roll 36 is suitably coupled to one end of an operating shaft 38 (Fig. 2), the opposite end of which carries a thumb wheel 40 by means of which the feed roll 36 may be manually rotated.

At the exit side of feed rolls 35, 36 is arranged a separating device 42 (Figs. 4 and 9) comprising spaced uprights 43 rigidly secured to the inner faces of walls 11 and 12 and formed adjacent to their upper ends with horizontal notches or grooves for the reception of the ends of a set of three removable separator plates 45, 46 and 47, the intermediate portions of which are formed with tapered or knife-like longitudinal edges. These plates are releasably held in position by means of a leaf-spring 48, the lower ends of which are attached to the uprights 43 so as yieldingly to engage the outer longitudinal edges of the plates, as shown more clearly in Fig. 9.

As the foils and insulating sheets emerge from the bite of feed rolls 35 and 36, the top ply, consisting of a bottom layer of metal foil *f* and two upper layers of paper insulating sheets *p*, is separated from the bottom ply by passing between the top plate 45 and intermediate plate 46, and in like manner the bottom ply is similarly separated by passing between the intermediate plate 46 and lower plate 47.

Outwardly beyond the separator 42 is a severing device 50 (Figs. 3 and 4) comprising a serrated cutting blade 51 (Figs. 6 and 7) secured to an operating arm 52 which is pivotally mounted on a vertical post 54 (Fig. 2) anchored to the bottom wall 14. A spring 55 is secured to one end of arm 52 so as normally to hold it in an elevated or inoperative position and the free end of the arm 52 extends through a guide slot in an upright 56 to provide an operating handle, as shown in Figs. 1 and 3. By swinging the handle downwardly the cutting blade 51 intersects the path of travel of the two plies and is thus effective to sever the strips.

The guiding and winding mechanism (Fig. 4) is located at the outer end of the housing defined by walls 11 and 12 and this mechanism comprises a guiding device 60 secured to walls 11 and 12 and having a generally triangular shaped cross-section providing upper and lower divergent guiding surfaces 61 and 62, the other face 63 being of concave semi-cylindrical shape with its longitudinal edges rounded, as indicated at 64 and 65 (Figs. 4, 10 to 13), and merging with the guiding faces 61 and 62. The longitudinal edge defined by the junction of the guiding faces 61 and 62 is horizontally aligned with the intermediate separator plate 46 so that as the top and bottom plies emerge from the separator they are presented to the upper and lower guiding faces 61 and 62, respectively.

The winding mechanism comprises a longitudinally split mandrel, here shown by way of illustration as consisting of two semi-cylindrical sections 70 and 71 having their opposite ends rigidly secured in axial bores formed in the end of aligned shafts 72 and 73 in such a manner that their respective free ends may be inserted in the bores on the opposite shafts, as shown more clearly in Fig. 8. The inner end of shaft 72 is rotatably mounted in an opening formed in the wall 11 and the central portion of the shaft 73 is similarly mounted in a post 74 secured to the bottom wall 14, the construction and arrangement of parts being such that the axis of rotation of the winding mandrel lies within the angle defined by the guiding surfaces 61, 62 and preferably is in substantially vertical registry with the rounded edges 64 and 65 of the guide members so that the plies are guided toward the winding mandrel at diametrically opposite points, as illustrated in Figs. 10 to 12. The outer end of the shaft 72 is journaled in an upstanding bracket 75 and this shaft is secured against axial movement by a collar 76 and the hub of gear 77 located on each side of the bracket 75. The outer end of shaft 73 is journaled in an upstanding bracket 78 and carries a thumb wheel 80 by means of which the shaft may not only be manually rotated, but also axially withdrawn so as to disengage the section 71 of the winding mandrel from the fixed section 70.

The winding mandrel is driven through gear 77 which meshes with a larger gear 82 fixed to one end of a drive shaft 83 suitably journaled in brackets 75 and 78. The opposite end of shaft 83 is connected with a suitable actuator, here shown as a crank 85 for manual operation, although it is to be understood that if desired an electric motor or other driving means may be employed.

In order to facilitate attaching the leading ends of the two plies to the winding mandrel, a pair of releasable holding fingers 90 and 91 are provided, each finger consisting of an angle-shaped member secured to a bent leaf-spring or the like resilient support 94 which is carried by the ends of a bracket 95 secured to the walls 11 and 12. The fingers 90 and 91 are so constructed and arranged that their depending free ends are normally spaced outwardly of the ends of the guide member, as illustrated in Fig. 4, so as not to interfere with the winding operation, but each finger may be swung inwardly to bring its end portion contiguous to the flat face of the fixed section of the winding mandrel, thereby to swing the leading end of the adjacent ply in position against the flat face of the fixed section and thus temporarily hold it while the replaceable section 71 is being inserted in position preparatory to the winding operation.

The operation of the machine is as follows:

In order to thread the machine the bottom foil *f* is first carried over the lowermost guide rod 18 of the rear guide block and then passed between the feed rolls 35, 36 by turning the knob 40, after which the foil is pulled over the lower separator plate 47, the upper end intermediate separator plates being removed to facilitate this operation.

When the foil shows at the front of the machine, the lowermost insulating sheet p is threaded over the second guide rod, through the feed rolls and separator so as to overlie the metal foil. In like manner the next layer of insulation is passed through the machine. The second or top foil f is now passed about one of the intermediate guide rods and through the feed rolls and when the end of the foil shows a short distance in front of the feed rolls the leading end of the foil is lifted and the intermediate separator plate 46 is inserted in position and further turning of the feed roll 36 will now bring this foil over the upper surface of separator plate 46. The two upper layers of insulation may now be threaded through the machine in similar manner, after which the upper separator plate 45 is inserted in position.

All films may be grasped by the hand and pulled taut and the cutter blade 51 may now be operated to sever the ends of the two plies. The machine is now ready for the winding operation, which proceeds as follows:

The treadle 31 is depresed so as to urge the feed rolls 35 and 36 together and the thumb wheel 40 is rotated so that the plies are fed outwardly the required distance necessary for attachment to the winding mandrel, as illustrated in Fig. 10, whereupon pressure on the treadle is released. With the replaceable section 71 of the winding mandrel removed, the upper holding finger 90 is first swung inwardly to carry the leading end of the upper ply against the flat face of the fixed section 70 of the winding mandrel and the lower holding finger 91 is similarly operated to bring the lower ply in position, thus overlapping the ends of the two plies preparatory to winding, as illustrated in Fig. 11. The replaceable section 71 is then slid into place and the upper and lower holding fingers are then released and allowed to return to normal position.

The pressure on the feed rolls 35, 36 is completely released by operating the treadle 31, that is by raising its free end by means of the toe of the operator's foot and the winding mandrel is then rotated in a counterclockwise direction (Fig. 12) by means of the crank 85. After having built up the required number of turns, during which the feed rolls 35 and 36 are held separated so that all winding is done only under such tension as is exerted by the supply rolls and guide rods, the treadle 31 is released so that only the normal slight pressure is exerted by spring 32 on the lower feed roll 35, whereupon the upper feed roll may be manually rotated to feed out an extra length of the top insulating sheet p for the purpose of sealing, it being understood that the adjustment of parts is such that when the feed roll 35 acts against the feed roll 36 by the normal pressure exerted by spring 32, rotation of the upper feed roll 36 is effective to advance only the upper layer of paper insulation p.

The cutter may now be operated so that the blade 51 severs the plies and the winding mandrel is rotated until the end of the top ply becomes available for the application of suitable sealing compound, as illustrated in Fig. 13, it being noted that the severed ends of the metal foils f are diametrically disposed, thus insuring proper insulation throughout the capacitor. The sealing compound is then applied, during which time the capacitor C is held against unwinding, and thereafter the winding is continued until the free end of the top ply is wrapped in place, thus completing the winding operation.

The replaceable section 71 may now be removed and the completed capacitor slipped from the fixed section after which the machine is now ready for the next winding operation.

The capacitor thus formed comprises several convolutions of the two plies, each consisting of a layer of metal foil and two layers of insulating sheet material, the metal foils being offset relative to the paper insulation and to each other and the two foils are separated by a thickness of two layers of the insulating sheets p.

While I have shown and described one desirable embodiment of the invention it will be understood that this is for the purpose of illustration and that various changes and modifications may be made without departing from the spirit and scope of the invention as set forth in the appended claims.

I claim:

1. Apparatus for making capacitors, comprising means for guiding lengths of metal foil and insulating sheet material to form plies each consisting of a layer of metal foil and at least one layer of insulating sheet material, a winding mandrel having separable parts constructed and arranged to hold the leading end portions of said plies, and guide members constructed and arranged to guide each ply toward said winding mandrel at substantially diametrically opposite points relative to its axis of rotation.

2. Apparatus for making capacitors, comprising means for guiding lengths of metail foil and insulating sheet material to form plies each consisting of a layer of metal foil and at least one layer of insulating sheet material, feeding means for advancing said plies along a predetermined path, a winding mandrel having parts constructed and arranged releasably to hold the leading end portions of said plies, and guide members operative to guide each ply toward said winding mandrel at substantially diametrically opposite points relative to its axis of rotation.

3. Apparatus for making capacitors, comprising means for guiding lengths of metal foil and insulating sheet material to form plies each consisting of a layer of metal foil and at least one layer of insulating sheet material, a second guiding means constructed and arranged to cause the plies to travel in diverging paths, and a winding mandrel rotatable about an axis within the angle defined by said diverging paths, said winding mandrel having means operative releasably to hold the leading ends of said plies.

4. Apparatus for making capacitors, comprising means for guiding lengths of metal foil and insulating sheet material to form plies each consisting of a layer of metal foil and at least one layer of insulating sheet material, a second guiding means having divergent surfaces effective to cause the plies to travel in diverging paths, and a winding mandrel rotatable about an axis within the angle defined by said diverging paths, said winding mandrel having parts operative releasably to hold the leading ends of said plies.

5. Apparatus for making capacitors, comprising means for guiding lengths of metal foil and insulating sheet material to form plies each consisting of a layer of metal foil and at least one layer of insulating sheet material, a second guiding means including a member of angle-shaped cross-section providing divergent surfaces effective to cause the plies to travel in diverging paths, and a winding mandrel rotatable about an axis within the angle defined by said diverging paths, said winding mandrel having a removable section operative releasably to hold the leading ends of said plies.

6. Apparatus for making capacitors, comprising means for guiding lengths of metal foil and insulating sheet material to form plies each consisting of a layer of metal foil and at least one layer of insulating sheet material, a winding mandrel having separable parts constructed and arranged to hold the leading end portions of said plies, guide members constructed and arranged to guide each ply toward said winding mandrel at substantially diametrically opposite points relative to its axis of rotation, and cutting means between the guiding means and said guide members for severing said plies.

7. Apparatus for making capacitors, comprising means for guiding lengths of metal foil and insulating sheet material to form plies each consisting of a layer of metal foil and at least one layer of insulating sheet material, a winding mandrel having separable parts constructed and arranged to hold the leading end portions of said plies, guide members constructed and arranged to guide each ply toward said winding mandrel at substantially diametrically opposite points relative to its axis of rotation, and a depressible finger associated with each of the guide members and operative to hold the free end of each ply in position with respect to said winding mandrel preparatory to the winding operation.

8. Apparatus for making capacitors, comprising means for guiding lengths of metal foil and insulating sheet material to form plies each consisting of a layer of metal foil and at least one layer of insulating sheet material, feeding means including a feed roll rotatable about a fixed axis and an adjustable roll movable toward and away from said fixed axis so as to control the feeding movement, a winding mandrel having separable parts constructed and arranged to hold the leading end portions of said plies, and guide members constructed and arranged to guide each ply toward said winding mandrel at substantially diametrically opposite points relative to its axis of rotation.

9. Apparatus for making capacitors, comprising means for guiding lengths of metal foil and insulating sheet material to form plies each consisting of a layer of metal foil and at least one layer of insulating sheet material, feeding means including a feed roll rotatable about a fixed axis and an adjustable roll movable toward and away from said fixed axis so as to control the feeding movement, a winding mandrel having separable parts constructed and arranged to hold the leading end portions of said plies, guide members constructed and arranged to guide each ply toward said winding mandrel at substantially diametrically opposite points relative to its axis of rotation, and cutting means positioned between said feed rolls and guide members for severing said plies.

10. Apparatus for making capacitors, comprising means for guiding lengths of metal foil and insulating sheet material to form plies each consisting of a layer of metal foil and at least one layer of insulating sheet material, feeding means including a feed roll rotatable about a fixed axis and an adjustable roll movable toward and away from said fixed axis so as to control the feeding movement, a winding mandrel having separable parts constructed and arranged to hold the leading end portions of said plies, guide members constructed and arranged to guide each ply toward said winding mandrel at substantially diametrically opposite points relative to its axis of rotation, a depressible finger associated with each guide member and operative to hold the free end of the adjacent ply in position with respect to said winding mandrel preparatory to the winding operation, and cutting means between said feeding means and the guide members for severing said plies.

11. Apparatus for making capacitors, comprising means for guiding lengths of metal foil and insulating sheet material to form plies each consisting of a layer of metal foil and at least one layer of insulating sheet material, a winding mandrel having separable parts constructed and arranged to hold the leading end portions of said plies, guide members constructed and arranged to guide each ply toward said winding mandrel at substantially diametrically opposite points relative to its axis of rotation, and separator means between the guiding means and guide members operative to separate the two plies as they travel toward said guide members.

12. Apparatus for making capacitors, comprising means for guiding lengths of metal foil and insulating sheet material in laterally offset relation to each other and to said sheet material so as to form two plies each consisting of an offset layer of metal foil and at least one layer of insulating sheet material, a winding mandrel having separable parts constructed and arranged to hold the leading ends of said plies, and guide members constructed and arranged to guide each ply toward said mandrel at substantially diametrically opposite points relative to its axis of rotation.

ERNST AUGUST NORDBERG.